United States Patent [19]
Blair

[11] Patent Number: 5,367,343
[45] Date of Patent: Nov. 22, 1994

[54] MOTION ENHANCED COMPRESSED VIDEO SYSTEM

[75] Inventor: Bruce A. Blair, San Diego, Calif.

[73] Assignee: Global Telecommunications Industries, Inc., Washington, D.C.

[21] Appl. No.: 922,700

[22] Filed: Jul. 30, 1992

[51] Int. Cl.$^5$ .................................................. H04N 5/14
[52] U.S. Cl. ........................................ 348/700; 348/384
[58] Field of Search .................. 358/105, 133, 85, 166, 358/167; 379/53; 348/700, 701, 384; H04N 5/14

[56] References Cited

U.S. PATENT DOCUMENTS 5,134,477  7/1992  Knauer ............................ 358/136
5,140,424  8/1992  Yoshimura ...................... 358/167

Primary Examiner—Howard W. Britton
Attorney, Agent, or Firm—Edward Dreyfus

[57] ABSTRACT

A compressed video system and method enhances the visual perception of motion for frame rates below 24 frames per second by intentionally introducing a motion smearing for the moving parts of displayed images. The system uses a frame or field buffer between the decompressor and A to D converter that averages the combination of the current frame or field digital video signal values and a progression of decreasing values of previous frame or field elements. Better (e.g. less jerky) moving images with reduced noise generation can be achieved with lower bit rates or bandwidth than with prior systems.

11 Claims, 2 Drawing Sheets

MOTION ENHANCED COMPRESSED VIDEO SYSTEM

FIELD OF INVENTION

This invention relates to video systems and more particularly to signal processing apparatus and methods for improving the performance of low frame rate compressed video transmission systems so that sharper images can be transmitted and displayed with improved motion characteristics but with less bandwidth requirements then is possible with prior art systems.

BACKGROUND OF INVENTION

Much progress has been made in the art of transmitting digital video signals for use by receiving terminals in a variety of applications such as video phones, video conference, and the like. High speed transmission services, such as T 1.5 carrier, ISN, 168 kilobit, 45 Megabit, ISDN<, and others are available to accommodate the high bandwidth required for video information transmission. In addition, data compression-decompression techniques are used to pack more video data into a given bandwidth which aids real time video and other applications.

Notwithstanding these and other advances, the high data content of full motion video prior art systems still require an undesirable technical trade-off between tile nature of the transmission capacity and the informational content required per unit of time for satisfactory video images. Serious bandwidth constraints arise when transmission occurs over analog telephone lines or when color information is part of the video informational content.

Data compression techniques only partially relieve these problems by reducing somewhat the number of bits needed to convey video images. In some cases, these techniques introduce other quality problems such as jerky motion caused by low frame rate transmission or display.

Today it is common practice to use various techniques in standard television and video to reduce noise, enhance picture sharpness, reduce cross-color effects, and otherwise process the video signals for enhancement before used for display. Certain well known techniques serving to reduce noise include processing video signals through a buffer that averages (pixel-by-pixel) two or more successive line, field or frame values so that noise , but not information, averages out. See the following U.S. patents:

Purports to show a noise reduction system using a frame buffer and frame averaging means: U.S Pat. No. 4,679,086.

Purports to show recursive noise reduction system with frame buffer with additional structure:

| U.S. Pat. No.: | 4,860,104 | U.S. Pat. No.: | 4,809,069 |
|---|---|---|---|
| | 4,639,783 | | 4,485,403 |
| | 4,388,729 | | 4,296,436 |
| | 4,240,106 | | 4,064,530 |

One major problem resulting from the use of this prior art technique relates to visual "smearing" of the displayed images that move over time. See U.S. Pat. No. 4,388 729. Motion detection and adaptive circuits have been developed to reduce the averaging effects (and thereby the smearing) for those parts of the displayed field/frame where motion is detected. These circuits generate motion compensation signals to reduce or control the smearing effects. See U.S. Pat. Nos. 4,296,436 and 4,860,104.

SUMMARY OF ONE EXAMPLE OF THE INVENTION

The invention is based on the realization that compressed, low frame rate video can be visually improved by introducing a slight smearing or blurring of the moving image portion with the use of noise reducing frame or field buffering techniques. Unlike conventional approaches, noise reducing field or frame averaging circuits, according to the present invention, are applied for post processing enhancement of digital (E.G. standard 8-bit) video signals at frame rates below 24 frames per second. Accordingly, a slight motion smearing or persistence of the picture image is used for the first time as a positive technique instead of a problem to be eliminated.

In one embodiment of the invention, a frame buffer is provided between the decompression stage and the D to A converter. The buffer stores the video information, pixel-by-pixel, of each frame. As each new pixel information arrives, it is summed into the corresponding pixel value from each stored frame, the result averaged, and the memory updated. Each pixel value now contains information, for example, consisting of :

| Pixel from the current | frame | $0 = \frac{1}{2}$ |
|---|---|---|
| Pixel from the last or | frame | $-1 = \frac{1}{4}$ |
| | frame | $-2 = \frac{1}{8}$ |
| | frame | $-3 = 1/16$ |
| | etc. | |

Any motion in the image will remain visible for a short duration as its contribution value to the current pixel value fades away.

The current pixel value displayed will be the sum of the above values with the effect of smoothing the motion of the image, allowing for lower frame and therefore lower bit rates to be acceptable. Because noise is non-additive, the process tends to reduce the noise in the picture while reinforcing the image. In this way, noise levels are reduced or eliminated and the motion smearing yields a perception of motion smoothing rather than a series of jerky, still frames displayed.

DETAILED DESCRIPTION OF ONE EMBODIMENT OF THE INVENTION

Figure 1:
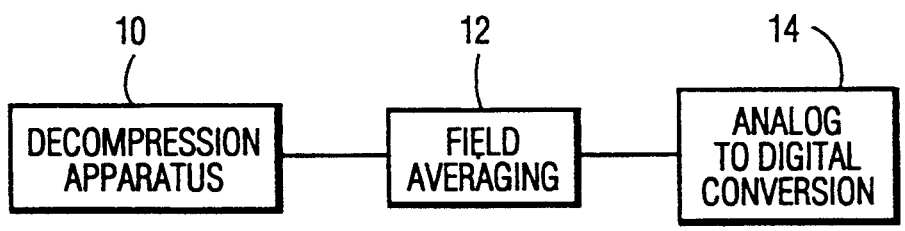
FIG. 1 shows the block diagram of one example of a system according to the present invention.

With reference to FIG. 1, there is shown the receiving side of a compressed video system according to the invention. Digital video signals arrive on input 8, are decompressed in accordance with standard , well known techniques, by decompression apparatus 10, and the decompress video signals, such as standard 8-bit digital signals, are applied to a field averaging stage 12. The field averaging stage, more fully described below, averages on a pixel-by-pixel basis the values of the current and those of all previous fields to produce an output video signal which is in essence a composite of the weighted values in decreasing order of the current and previous field values. This composite video signal, again such as an 8-bit video signal, is applied to the D to A converter stage 14 of the receiver. The output of stage 14 can be applied as desired to a standard output processor (not shown) for display, storage, transmission or some other application or use.

It will be understood that the receiver according to the invention may be part of a terminal apparatus (video telephone, pc or workstation with video capability, compressed television, VCR, or other application terminal or system that processes compressed video signals. The intention also has application with NTSC and RGB or other well known standards.

The unit averaging stage can also be configured as a separate board type apparatus for interconnection between the decompressor and the D-A converter of commercially sold systems of this type.

Figure 2:
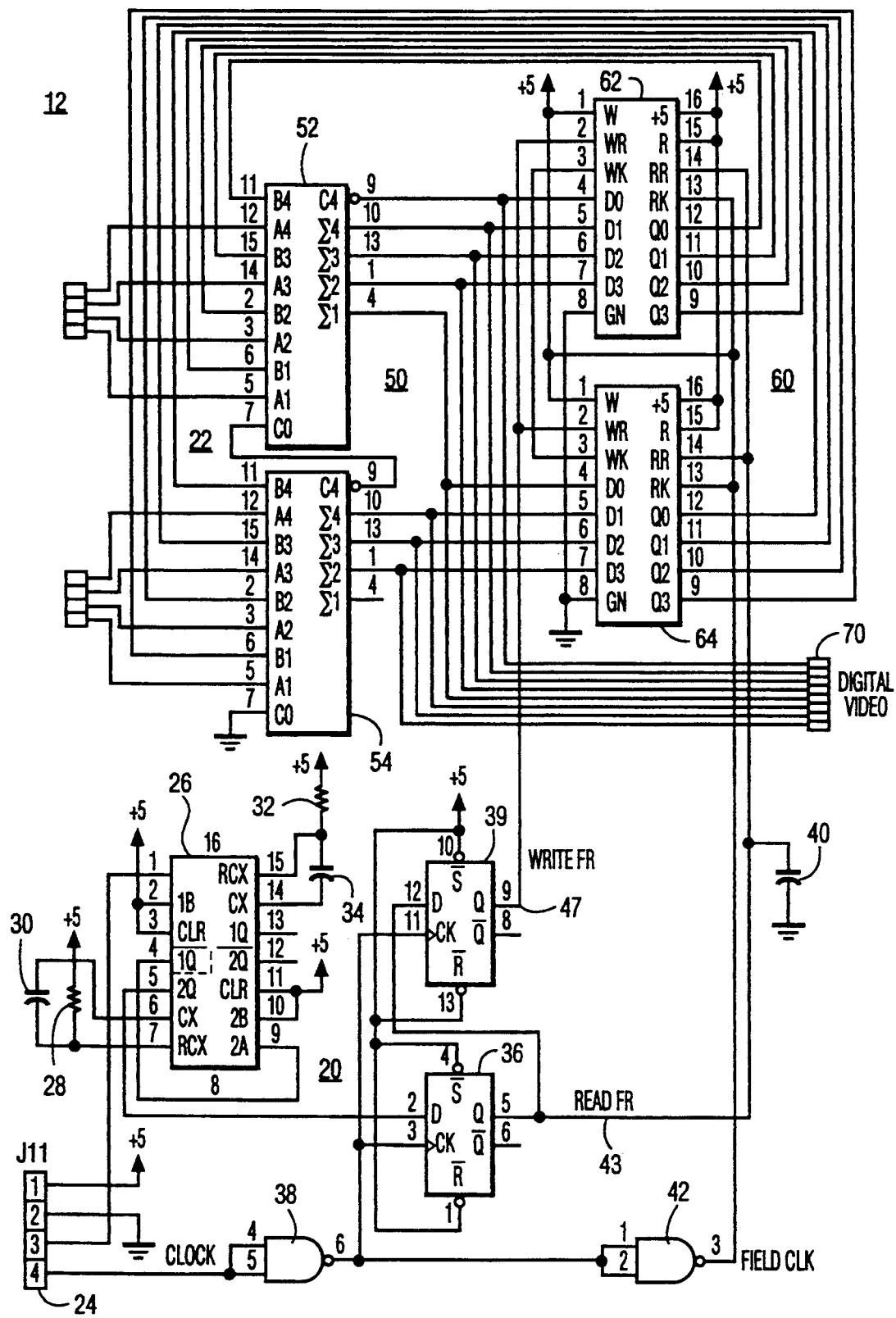
FIG. 2 shows one example of a circuit within block 12 according to the present invention.

Referring to FIG. 2, unit averaging stage comprises an averaging section 22 and a management section 20 for maintaining proper synchronization between the output of the stage 12 and the rest of the receiver components. Section 22 includes a 4 lead input device 24. Pin 4 receives the clock pulse and pin 3 receives the blanking pulse. Pin 2 connects to round and pin 1 connects to a +5 volt power supply. Blanking pulses are also applied to pin 1 of a one shot regenerative, monostable multivibrator 26 that establishes the timing and pulse duration that controls the averaging section 22 output as described below. Multivibrator 26 is pulsed on during the horizontal blanking and turns off during the vertical blanking. RC circuits 28, 30, 32, and 34 assure that the multivibrator 26 remains on for more than one video horizontal line duration but less than the period from the start of vertical blanking to the start of the first horizontal line.

The other pins of Multivibrator are connected as shown with the output pin 5 connected to the input pin 2 of d-flip flop 36 which functions to control the memory output described below. Register 39 functions to run the memory at the vertical blanking rate. Inverter 38 inverts and connects the clock signal from input 24 to pin 3 of d-register 36 and pin 11 of D-register 39. The output pin of D-register 36 is connected to input pin 5 of D-register 39 so that the combination of registers 36 and 39 function to delay by one clock cycle the appreciation of the write and read pulses that appear on the pins 9 and 12, respectively, of register 39.

Inverter 38 output is also applied to a second inverter 42 that produces the pulse for each pixel period for application to the memory stage as described below.

With reference to the averaging stage 22, the 8-bits representing each pixel value is applied to the leads of the 8-bit adder 50 comprising two 4-bit adders tied together 52 and 54. The 1, 2, 3 and 4 bit positions are applied to leads 12, 14, 3, and 5 of adder 52 and the 5, 6, 7, and 8 bit positions are applied to leads 12, 14, 3 and 5 of adder 54. Additional input lead 11, 15, 2, and 6 are connected to receive the output leads of FIFO memories 60 as described below.

Note pin 7 of adder 52 is tied to pin 9 of adder 54 and that pin 4, representing the least significant bit, output is dropped. In this way, adder 50 functions to add the 8-bit output of the memory 60 to the current 8-bit value of the current pixel, average the resulting value (IE divide by two by dropping the least significant bit), and apply the resulting averaged value to the video output 70 and to the input leads of the FIFO memory sections 62 and 64

Sections 62 and 64 are enabled to apply the stored digital 8-bit word to the output pins 9, 10, 11, and 12. Sections 62 and 64 are enabled to accept for storage the 8-bit output from adder 50. The clock pulse on lead 45 is applied to control pins 13 of the memory sections 62 and 64. The clock pulse on lead 45 has a period of a single pixel. The delay time (in this embodiment of one field duration) of the FIFO memory 60 is determined by the read and write pulses applied to pins 14 and 2 of memory 60.

In operation, an 8-bit digital word including the pixel value information for the current field (E.G. field A) arrives at the input pins of adder 50. The clock pulse from inverter 42 causes the FIFO memory to apply its output to the input leads of adder 50. Adder 50 generates the average (Divide by two) between these two values and applies resulting the 8-bit word to the output 70 and to the input of the FIFO memory 60 where that value is field A divided by two.

The process is repeated for the next field B. Adder 50 adds the value of field B to the value of field A divided by two and divides that sum by 2 and applies the result to output 70 and FIFO memory 60, where this composite stored value is:

field B divided by two plus field A divided by four.

The process is repeated for the next field C. Adder 50 adds the value of new field C to the values of (Ti field B/2+field A/4)

and then divides the sum by two and applies the result to output 70 and to FIFO memory 60 where the stored value is (field C/2)+(field B/4)+(field A/8).

It will be understood that the reference to "field" is actually a reference to the process performed on sequential fields on a corresponding pixel-by-pixel basis.

The process is repeated and the following is applied to output 70 and the FIFO memory:

(field D/2)+(field C/4)+(field B/8)+(field A/16)

The process is repeated indefinitely.

The visual result of the apparatus and process according to the invention is to produce a persistence in the image which produces the motion smoothing, smearing or blurring effect, herein referred to severally and collectively as "smearing". This feature then increases the perception of motion and better visual clarity in moving images in a compressed video system having a frame rate below 24 frames per second, and will produce this result without an increase in required transmitted bit rate. Also, as stated above noise is nonadditive and averages out thus enhancing the picture quality.

One example of values of elements of a working embodiment of stage 12 of the present invention include:

| 26 | 74LS123 | 34 | .001UF | 40 | 330PF |
|----|---------|----|--------|----|-------|
| 28 | 33K | 36 | ½ 74LS74 | 42 | ½ 74LS00 |
| 30 | 330PF | 38 | ½ 74LS00 | 52 | 74F283 |
| 32 | 150K | 39 | ½ 74LS74 | 54 | 74F283 |
|    |     |    |     | 62 | TMS4C1050 |
|    |     |    |     | 64 | TMS4C1050 |

It should be understood that the present invention can be implemented in a circuit board or chip set configuration mounted into or used with a video terminal or system as described above.

It will be understood that the above description is but one example of the present invention. Various modifications and changes can be made without departing from the spirit and scope of the present invention.

For example, pixel value processing divides the previous frame values by 2 in the above embodiment, but the process may employ a division by some other factor such as 1.5 or 3 to achieve somewhat different motion smearing effects. Benefits of using two include (i) this produces an average value and (ii) it requires the least number of electronic components to implement, and (iii) it produces a good to excellent visual motion effects for frame rates below 24.

What is claimed is

1. A method of enhancing the visual perception of motion in the display of a compressed video system having a frame rate of less than 24 frames per second comprising:
   a. decompressing video digital signals
   b. processing said decompressed video digital signals to introduce a visual smearing effect in the displayed moving images of a single frame, and
   c. converting the processed video digital signals to analog signal representations.

2. A method according to claim 1 wherein:
   a. said step of decompressing includes decompressing video digital signals of a number of video units over time,
   b. said step of processing includes
      (i) storing progressively decreasing digital values of the decompressed video signals of previously occurring video units,
      (ii) combining the corresponding stored digital signals and the current video unit digital signals,
      (iii) reducing the value of the combined digital signals, and
      (iv) storing the reduced value of the combined digital signals, and
   c. said step of converting includes converting the reduced value of the combined digital signals to analog representations of the values of said combined digital signals.

3. A method of claim 1 wherein the step of processing includes storing progressively decreasing values of digital signals corresponding to the occurrence of the video unit in which they occurred, and combining the digital video signals of the current video unit with the corresponding stored values of the stored combined digital signals of previous video units.

4. A method of claim 3 wherein the step of combining includes adding and dividing the sum by a factor greater than one.

5. A method according to claim 3 wherein the step of combining includes averaging the combined values of the stored digital signal values and the corresponding current video unit digital signal values.

6. A system for enhancing the visual perception of motion in the display of a compressed video system having a frame rate of the than 24 frames per second comprising:
   a. a decompressor for decompressing video digital signals,
   b. buffer means for processing said decompressed video digital signals to introduce a motion smearing effect in the displayed moving images of a single frame, and
   c. means for converting the processed video digital signals to analog signal representations.

7. A system according to claim 6 wherein:
   a. said buffer means includes,
      (i) memory means for storing progressively decreasing digital values of the decompressed video signals of previously occurring video units,
      (ii) combining means for combining the corresponding stored digital signals and the current video unit digital signals,
      (iii) means for reducing the value of the combined digital signals, and
      (iv) means for applying the reduced value of the combined digital signals to the memory and to the converting means.

8. A system of claim 6 wherein the buffer means includes means for storing progressively decreasing values of digital signals corresponding to the occurrence of the video unit in which they occurred, and combining means for combining the digital video signals of the current video unit with the corresponding stored values of the stored combined digital signals of previous video units.

9. A system of claim 8 wherein the combining means includes an adder and the means for reducing includes means for dividing the result of the adder by a factor greater than one.

10. A system according to claim 8 wherein the combining means includes means for averaging the combined values of the stored digital signal values and the corresponding current video unit digital signal values.

11. A system according to claim 8 further including synchronizing means for synchronizing the storing means and the combining means outputs in relation with the clock signals of the video signals to be displayed.

* * * * *